United States Patent [19]

Reves

[11] 3,712,135

[45] Jan. 23, 1973

[54] CALIBRATING MEDIUM DISPLACEMENT FLOW RATE CALIBRATOR

[75] Inventor: E. T. Reves, Odessa, Tex.

[73] Assignee: Dart Industries, Inc., Los Angeles, Calif.

[22] Filed: Oct. 29, 1971

[21] Appl. No.: 193,927

[52] U.S. Cl. ................................. 73/219, 137/599.1
[51] Int. Cl. ............................................. F16h 7/00
[58] Field of Search .73/219, 220; 137/599.1, 624.11

[56] References Cited

UNITED STATES PATENTS 2,325,695   8/1943   McAfee ................................. 73/219

Primary Examiner—Jerry W. Myracle
Assistant Examiner—Arthur E. Korkosz
Attorney—Fred S. Valles et al.

[57] ABSTRACT

A flow rate calibration apparatus and method therefor is designed to accurately calibrate the flow rate of very small streams that are difficult and potentially dangerous to handle. The apparatus is particularly adaptable to measuring the flow rates of relatively high pressure streams.

The apparatus comprises a receptacle for a calibrating medium, e.g., mercury, which receptacle contains a high pressure leg with an inlet and a low pressure leg with an outlet and a conduit interconnecting the legs for maintaining them in fluid communication; sensing means for sensing differential pressure; conduit means for flow of fluid from the pump through the sensing means and the inlet to the high pressure leg and for flow of the fluid from the low pressure leg through the outlet and the sensing means to the receiving vessel during the calibrating portion of the cycle; by-pass means for by-passing the fluid around the first means during the by-pass portion of the cycle; and timing means for controlling the time interval the apparatus remains in the calibrating portion of the cycle and for controlling the time interval the apparatus remains in a by-pass portion of the cycle. The differential is translated directly into a reading of amount of fluid pumped over the time interval of the calibrating portion of the cycle.

12 Claims, 4 Drawing Figures

INVENTOR.
E. T. REVES
BY Richard A. Dannells Jr.
ATTORNEY

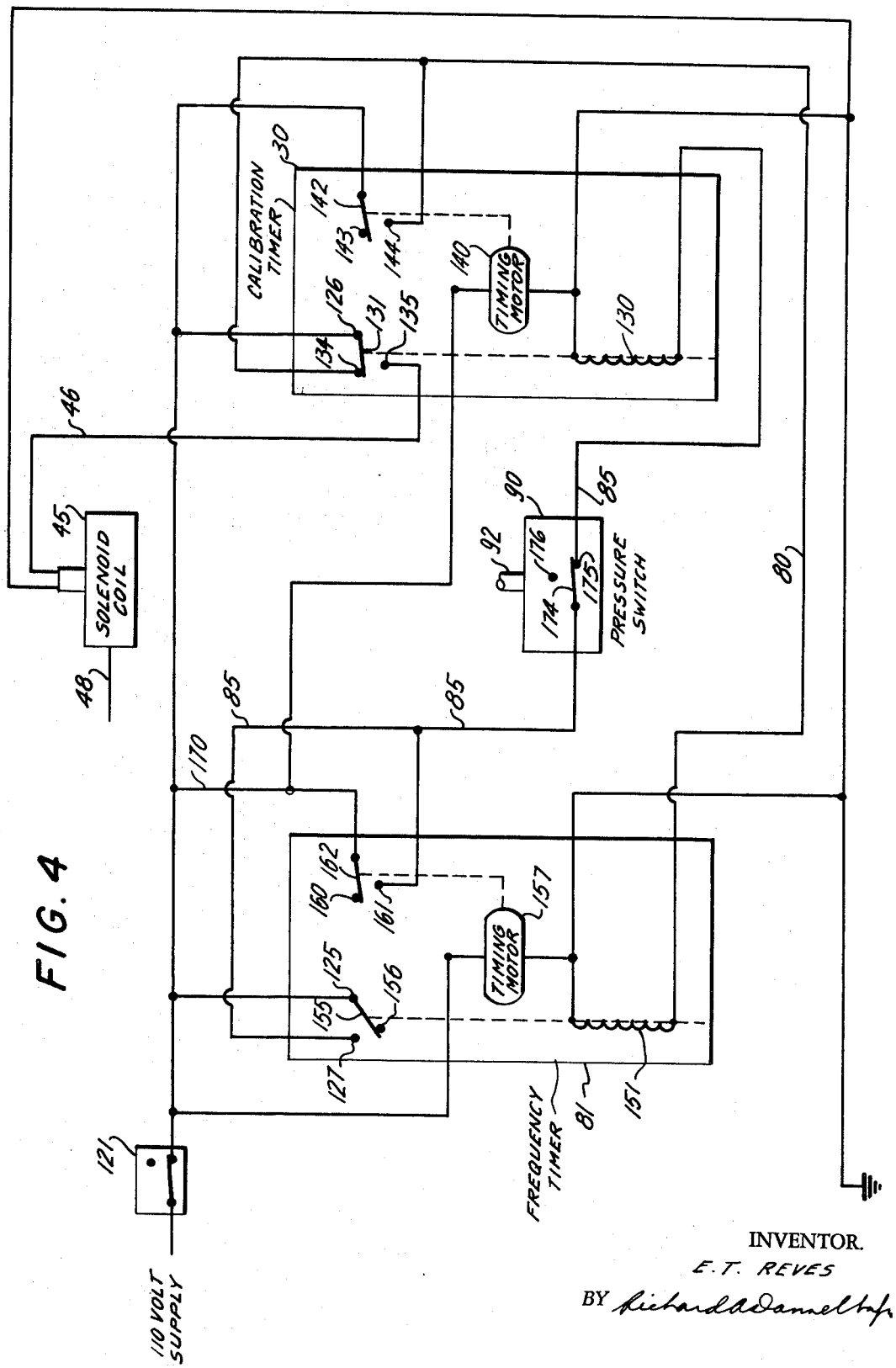

CALIBRATING MEDIUM DISPLACEMENT FLOW RATE CALIBRATOR

BACKGROUND OF THE INVENTION

The present invention is directed to an apparatus and a method for calibrating the flow rate of a fluid, and, more particularly, for accurately calibrating the flow rate of small streams of materials that are potentially dangerous to handle, such as catalyst solutions by means of a calibrating medium.

The prior art method to calibrate the flow rate of such potentially dangerous streams was to periodically calculate the rate based on the variables of volume, pressure, temperature and time. This was very time-consuming which resulted in detrimental delays before rate changes could be compensated for due to plant upsets. Developments in computer technology has led to the design of complex equipment which has been used in mass flow systems. However, where a number of small streams at various rates are being pumped into a number of different receiving vessels, there is a great need for less complex and for an inexpensive answer to the calibration problem.

SUMMARY OF THE INVENTION

The present invention provides an answer to the problem of accurately calibrating small flow rates of fluids through a pump to a receiving vessel. The apparatus comprises:

a. a receptacle which contains a calibrating medium that is denser than and immiscible to the fluid being calibrated, the receptacle having a high pressure leg with an inlet above the medium and a low pressure leg with an outlet above the medium and a receptacle conduit means for maintaining the legs in fluid communication, b. sensing means for sensing differential pressure, c. conduit means for flow of the fluid from the pump through the sensing means and the inlet to the high pressure leg and for flow of the fluid from the low pressure leg through the outlet and the sensing means to the receiving vessel during the calibrating portion of the cycle, d. by-pass means for by-passing the fluid around said sensing means from the pump to the receiving vessel during the by-pass portion of the cycle, and e. timing means for controlling the time interval the apparatus remains in the calibrating portion of the cycle and for controlling the time interval the apparatus remains in the by-pass portion of the cycle.

A second means is provided for receiving a signal of differential pressure from the sensing means and for translating the signal into amount of fluid pumped over the time interval of the calibrating portion of the cycle. The amount in volume of fluid or weight of fluid is generally continuously recorded for ease in monitoring of the critical flow of, for example, a catalyst slurry or solution to suitable receiving vessel, such as a reactor.

The calibrating timing mechanism of the timing means is operably connected to the by-pass means and controls the time interval the apparatus remains in the calibrating portion of the cycle. The calibrating timing mechanism comprises a timing motor, switch means and relay means. The relay means activates one of the switch means which sends a signal closing the by-pass means and diverting the flow of fluid from the pump to the inlet of the high pressure leg during the calibrating portion of the cycle. After a given time interval, the timing motor activates a second switch means which, in turn, activates the frequency timing mechanism of the timing means.

The frequency timing mechanism comprises the same components as the calibrating timing mechanism. As soon as the relay coil of the frequency timing mechanism receives the signal from the calibrating timing mechanism, one of its switch means is opened which causes the by-pass means to open and to divert the flow of fluid from the pump through the by-pass means to the receiving vessel. After a given time interval the timing motor of the frequency timing mechanism sends a signal to the relay means of the calibrating timing mechanism and the complete cycle is repeated.

Pressure switch means can be operably connected between the frequency timing mechanism and the calibration timing mechanism and operably connected to the sensing means for activation in the event the signal from the signal means exceeds a fixed amount. The pressure switch means is a safety device to prevent the calibrating medium from leaving the receptacle and entering the conduit means.

The method for calibrating the flow of fluid through a pump to the reactor comprises the following steps:

a. setting the calibrating timing mechanism for the time interval one wishes the apparatus to remain in the calibrating position;

b. pumping the fluid for the time interval set by step (a) into the high pressure leg of the receptacle;

c. displacing an equal volume of fluid from the low pressure leg of the receptacle to the reactor;

d. continuously sensing in the sensing means the differential pressure and transmitting the signal represented by the differential pressure over the time interval set by step (a);

e. setting the frequency timing mechanism for the time interval one wishes the apparatus to remain in the by-pass position;

f. pumping the fluid from the time interval set by step (e) through by-pass means around the sensing means to the reactor; and g. translating the signal from step (d) over the time interval of step (a) into amount of fluid flow per time interval.

BRIEF DESCRIPTION OF THE DRAWINGS

The present invention will be more readily understood when read in conjunction with the accompanying drawings in which:

FIG. 4 is a diagram of the circuit employed by the timing means of the calibrating apparatus during the by-pass portion of the cycle.

PREFERRED EMBODIMENT OF THE PRESENT INVENTION

Figure 1:
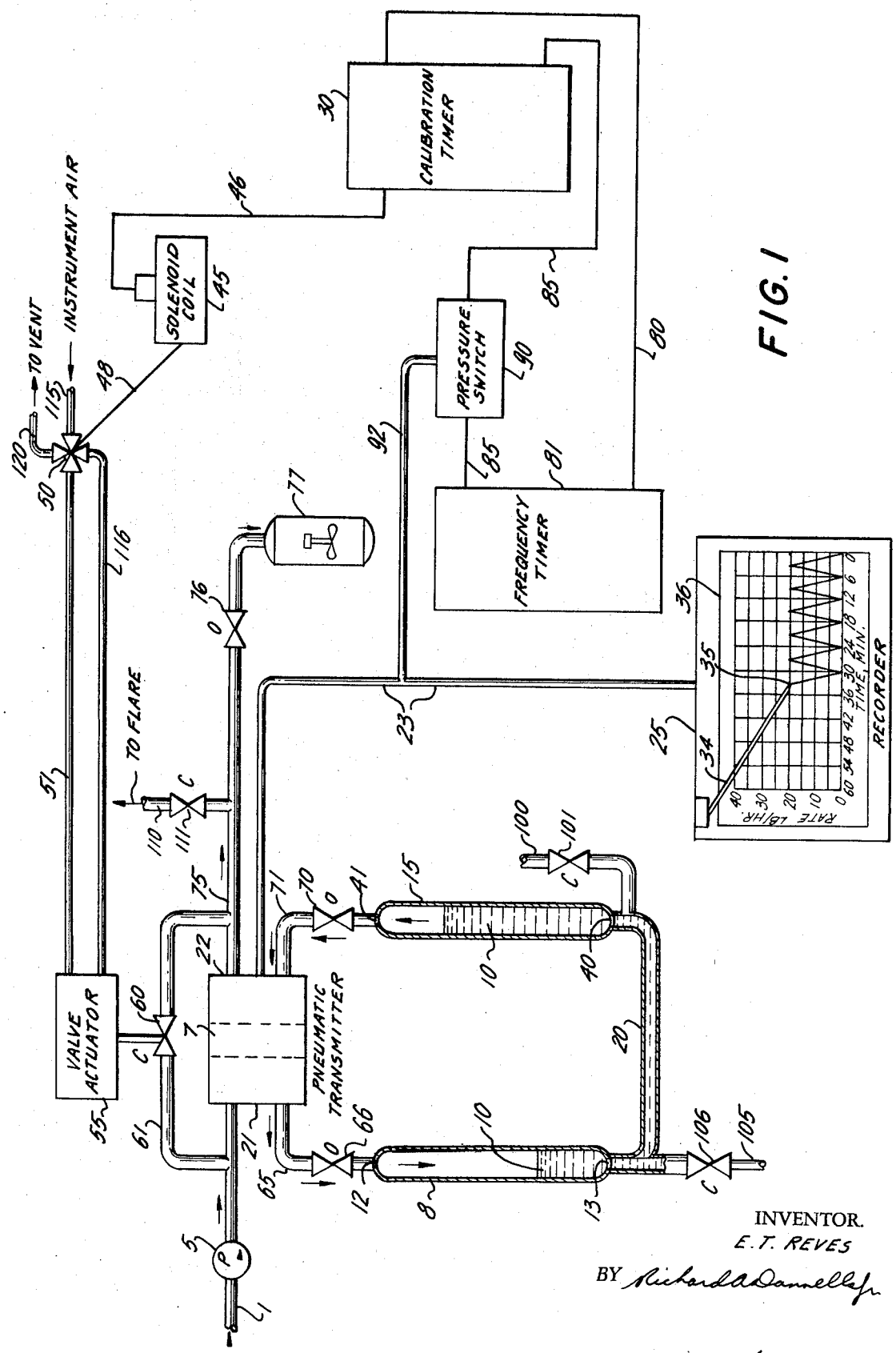
FIG. 1 is a schematic diagram of one embodiment of an apparatus of the present invention shown in its timed-out calibrating position.

Referring now to the drawings in detail and, initially FIG. 1, a catalyst solution is pumped through supply conduit 1 from a feed source not shown via pump 5 through pneumatic transmitter 7 to high pressure column 8 to cause the calibrating medium 10 to move from inlet 12 to outlet 13. The calibrating medium must be denser than and immiscible to the fluid being pumped. The most suitable calibrating medium has been found to be mercury. The movement of calibrating medium 10 in column 8 causes a corresponding movement in low pressure column 15 which is joined to high pressure column 8 by means of conduit 20. Pneumatic transmitter 7 senses the difference in pressure from high pressure side 21 to low pressure side 22 which is equal to the density of the mercury minus the density of the fluid times the difference in the height of the two legs of calibrating medium. The differential pressure sensed by pneumatic transmitter 7 is converted into a pneumatic signal that is transmitted to recorder 25. Recorder 25 continuously plots the flow rate, e.g., pounds per hour, of the fluid that is pumped into high pressure column 8 during the fixed time interval set by calibration timer 30. Recording pen 34 is shown plotting peak 35 on strip chart 36 of recorder 25 which is an indication that the apparatus is in its timed-out calibrating position. The length of time for calibrating medium 10 to reach this position is determined and initially set by the plant operator on calibration timer 30.

In one specific example a catalyst solution having a density of about 8 pounds per gallon was maintained at a rate of 20 pounds per hour. The cylinders are sized and charged with a quantity of calibration medium which will give a maximum pneumatic signal, e.g. 15 psig, from transmitter 7 without the medium being displaced from either of the columns. The plant operator had previously selected strip chart 36 with graduations of 0 to 40 pounds per hour and set calibration timer 30 at approximately 3-½ minute intervals for the calibrating portion of cycle of the apparatus and set frequency timer 81 at approximately 5 minute intervals for the by-pass portion of the cycle. Therefore, at a pump rate of 20 pounds per hour, calibrating medium 10 was displaced approximately 5-½ inches of the way from inlet 12 to outlet 13. Similarly, the calibrating medium was displaced approximately 5-½ inches of the way from inlet 40 of low pressure cylinder 15 to outlet 41. This, in turn, created a pressure differential of approximately 6 psi which is sensed by pneumatic transmitter 7. The pressure differential is converted to a pneumatic signal of 9 psig which is transmitted to recorder 25 where the signal is converted to a reading of 20 pounds per hour by means of properly selected strip chart 36.

During the calibrating portion of the cycle, calibration timer 30 sends a signal to solenoid coil 45 through circuit 46. Solenoid coil 45 then sends a signal through circuit 48 to solenoid valve 50 which sends a pneumatic signal through line 51 to valve actuator 55 which closes by-pass valve 60 preventing the flow of fluid from by-passing through branch line 61 around pneumatic transmitter 7. The flow of fluid instead passes through high pressure side 21 of pneumatic transmitter 7, line 65, valve 66, inlet 12 into high pressure column 8. The fluid displaces calibrating medium 10, as discussed above, which, in turn, displaces an equal volume of the fluid above calibrating medium 10 in low pressure column 15 through outlet 41, valve 70, line 71, low pressure side 22 of transmitter 7 into discharge line 75. The fluid in discharge line 75 passes through discharge valve 76 into stirred reactor 77 which is a conventional vessel for chemical reactions.

After the fixed time interval as determined by calibration timer 30, calibrating medium 10 reaches its lowest point of the cycle. A signal is then sent through circuit 80 to frequency timer 81 which, in turn, sends a signal through circuit 85 back through calibration timer 30 and circuit 46 to solenoid coil 45. Solenoid coil 45 then relays the signal through circuit 48 to solenoid valve 50 which sends the necessary pneumatic signal via line 51 to valve actuator 55, opening by-pass valve 60.

Pressure switch 90 is electrically connected within circuit 85 between frequency timer 81 and calibration timer 30 to immediately alternate the circuit from the calibration portion to the by-pass portion of the cycle in the event the pressure in line 23 exceeds a fixed amount due to transmitter 7 sensing an abnormally large pressure differential. The pneumatic signal from transmitter 7 is passed to pressure switch 90 via line 92. Pressure switch 90 is designed to prevent the problem that would be created in the calibration apparatus by a surge of pressure due to a malfunction of pump 5 or for a variety of other reasons. This surge of pressure could cause calibrating medium 10 to pass through opening 41 into discharge line 75 were it not for this safety feature.

Line 100 is used to introduce calibrating medium into the apparatus through valve 101 before start-up of the calibration apparatus. Line 105 is used to discharge the calibrating medium from the system through valve 106 in the event it becomes contaminated with fluid or for any other reason. Valves 66 and 70 are closed during the filling of the system with the calibrating medium or during the discharging of the calibrating medium from the calibration system.

Vent line 110 is used during the initial start-up, during which time the fluid that passes through discharge line 75, line 110, and valve 111 where the fluid passes to flare (not shown) be be burned.

The calibrating medium displacement calibration system of this invention is initially started up by setting calibration timer 30 to the desired time interval for the calibrating portion of the cycle and frequency timer 81 for the desired time interval for the by-pass portion of the cycle. Valve 76 is closed and valve 111 is opened. The catalyst which is dissolved in a suitable solvent or initially just the solvent itself is pumped via pump 5 through inlet 12 of column 8 for the fixed time interval of the calibrating portion of the cycle and through line 110 and valve 111 during the by-pass portion of the cycle. During the by-pass portion of the cycle, a portion of the catalyst stream in discharge line 75 flows back into pneumatic transmitter 7 and through line 71 and opening 41 of column 15. Eventually after a number of complete cycles, the space above the calibrating medium is filled with the catalyst solution. Valve 111 is then closed, valve 76 is opened and the continuous calibration of the catalyst solution to reactor 77 is maintained.

This system provides a continuous flow of solution to reactor 77 during both the calibrating and by-pass portions of the cycle.

Solenoid valve 50 is shown with instrument air from a source not shown being introduced through line 115. Line 116 returns the pneumatic single from valve actuator 55. Line 119 on solenoid valve 50 provides access to a vent through line 120.

Figure 2:
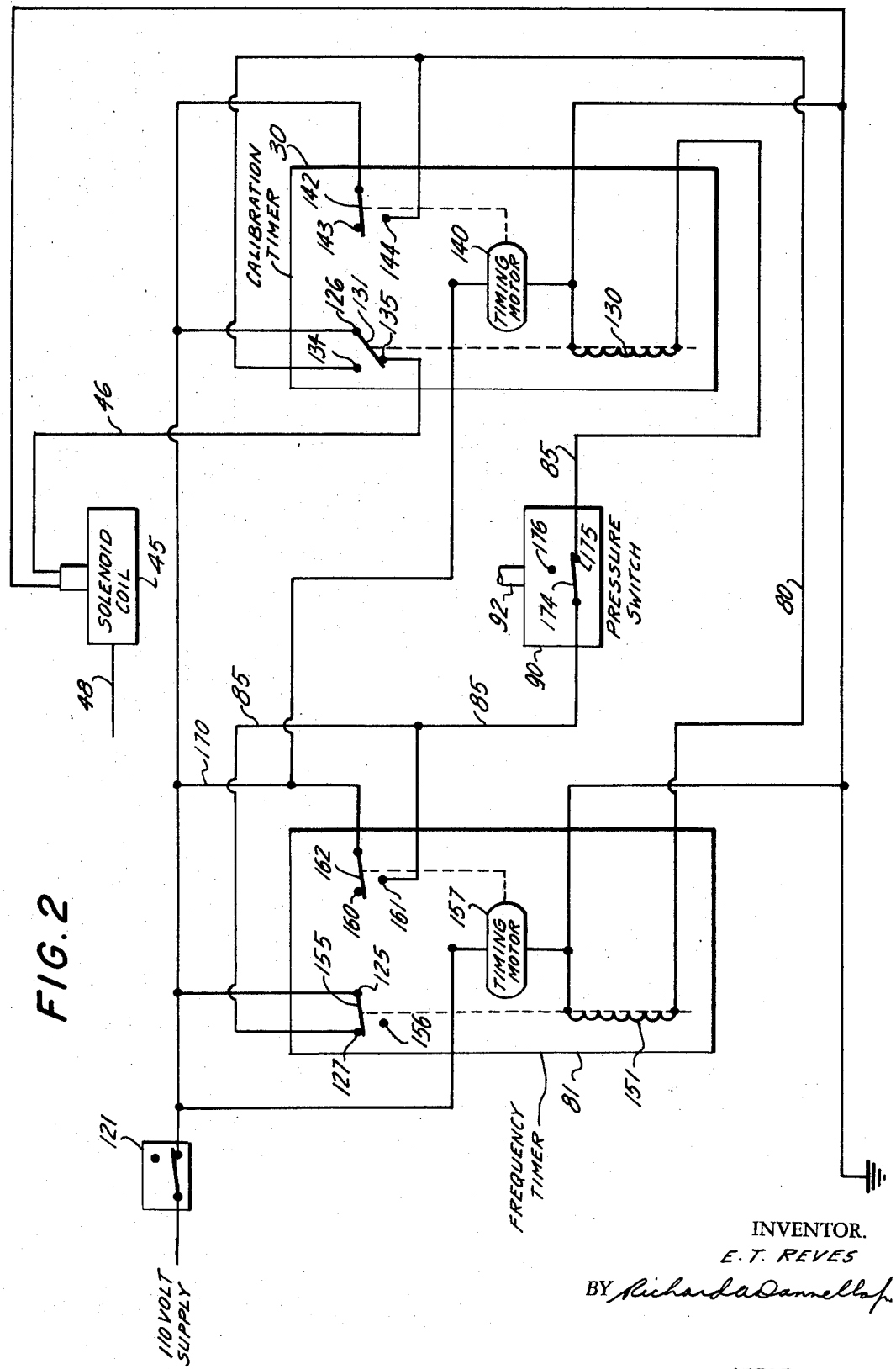
FIG. 2 is a diagram of the circuit employed by the timing means of the apparatus of this invention during the calibrating portion of the cycle.

Referring now to FIG. 2, a circuit diagram is depicted showing the position of calibration timer 30 and frequency timer 81 during the calibration portion of the cycle. Calibration timer 30 and frequency timer 81 are electrically connected so that as soon as switch 121 is in its "on" position, either timer starts the cycle depending on whether current arrives first to terminal 125 in frequency timer 81, or terminal 126 in calibration timer 30. Once switch 121 is placed in its "on" position and the cycle is started, it is continuous with alternations between the calibrating and by-pass portions for the fixed time intervals which can be of different length in a given cycle. The only deviations from the cycle are caused when pressure switch 90 becomes activated by an upset. Assuming that the current reaches terminal 125 first, current passes through terminal 127, circuit 85, through relay coil 130. As soon as relay coil 130 is energized, a mechanical linkage indicated by the dotted line is engaged causing contact arm 131 to break contact at terminal 134 and make contact at terminal 135. This allows current to flow through circuit 46 to solenoid coil 45. As soon as the fixed time interval of the calibration portion of the cycle has elapsed, timing motor 140 causes contact arm 142 to break contact at terminal 143 and make contact at terminal 144. The current then passes through circuit 80 and relay coil 151 of frequency timer 81 which, in turn, causes contact arm 155 to break contact with terminal 127 and make contact with terminal 156. This ceases current to relay coil 130 of calibration timer 30, which allows contact arm 131 to break contact at terminal 135 and make contact at 134, as will be explained in more detail below in connection with FIG. 4.

Figure 3:
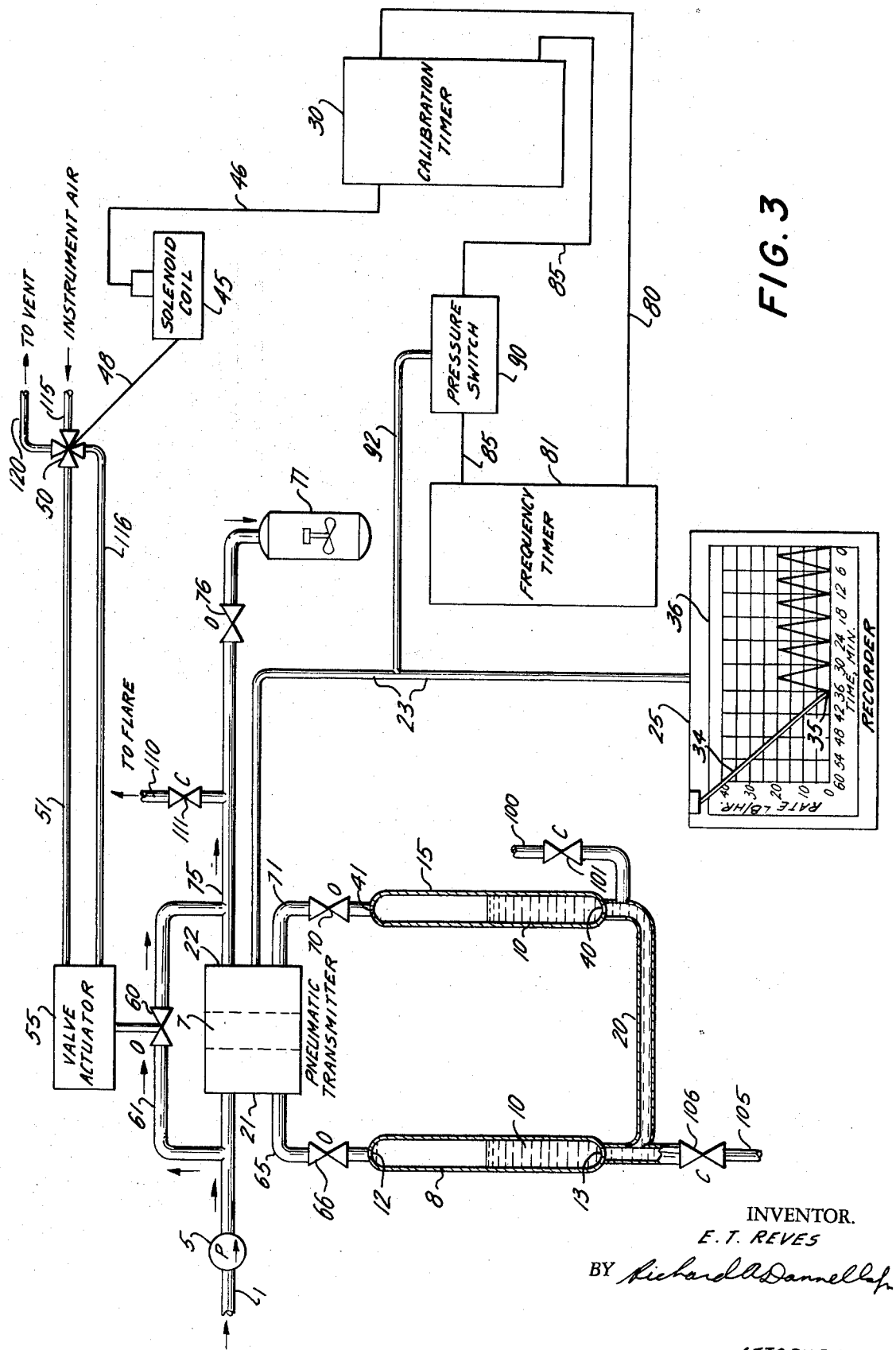
FIG. 3 is a schematic diagram of one embodiment of the present invention shown during the by-pass portion of the cycle.

Referring now to FIG. 3, the apparatus is shown during the by-pass portion of the cycle in which the catalyst solution is pumped through supply conduit 1 via pump 5 to by-pass valve 60, discharge line 75, valve 76, into reactor 77. Calibrating medium 10 reaches a point of equilibrium in columns 8 and 15. Recording pen 34, as shown, indicates that the flow transmitted by pneumatic transmitter 7 is 0. Valve actuator 55 maintains by-pass valve 60 in an open position as described in detail below in connection with FIG. 4. All other aspects of FIG. 3 are identical to those discussed above in connection with FIG. 1.

Referring now to FIG. 4, a circuit diagram is depicted showing the positions of the switches of frequency timer 81 and calibration timer 30 during the by-pass portion of the cycle. As described above, contact arm 155 is held into contact with terminal 156 by means of relay coil 151 during the entire by-pass portion of the cycle so that no current is passed to solenoid coil 45, and thus by-pass valve 60 remains in its open position. After the by-pass portion of the cycle, timing motor 157 of frequency timer 81 causes contact arm 162 to come into contact with terminal 161. This immediately sends current through circuit 170 and circuit 85 to relay coil 130 which activates contact arm 131 and the calibrating portion of the cycle resumes as discussed in connection with FIG. 2.

Pressure switch 90 will be activated in the event the change in pressure across pneumatic transmitter increases to such a point that the pneumatic signal in line 23 exceeds a given value, e.g., 15 psig in this example. When this pressure is exceeded, contact arm 174 breaks contact with terminal 175 and makes contact with terminal 176. This immediately prevents the current from passing through relay coil 130 of calibration timer 30. This causes contact arm 131 to break its contact with terminal 135 and make contact with terminal 134. Current then flows through relay coil 151 of frequency timer 81 which starts timing motor 157 into the by-pass portion of the cycle. During the by-pass time interval, the calibrating medium can reach its equilibrium in columns 8 and 15, and thus it is prevented from entering low pressure side 22 of the pneumatic transmitter 7 and into discharge line 75 which would occur if the pressure differential were allowed to exceed a given amount.

Pneumatic transmitter 7 can be replaced by an electric or electronic transmitter which senses the pressure differential and transmits an electric signal to the recorder. One suitable pneumatic transmitter is the commercially available Model 274A manufactured by Barton Instrument Corporation, a subsidiary of ITT. One suitable timing means for both frequency and calibration timers that are commercially available is the Model HP-53-A601 Eagle Signal Timer. One suitable commercially available pressure switch is Model KC MO Catalog 12N-K 45 Static "O" Ring 4D1.

The calibration medium displacement calibration system of this invention has many advantages. Pulsations in the flow of fluid for any reason do not affect the accuracy of the system. By merely changing the sizes of the columns used to contain the calibrating medium, one can calibrate a very wide range of flow rates. Less drastic changes in rate can easily be adjusted by setting a new time interval on calibration timer 30. The system can be used for measuring extremely small flow rates of less than 0.1 lb/hr. This system can be used for accurately measuring streams that are being pumped at relatively high pressure, e.g., 1000 psig and higher.

While only certain embodiments of this invention have been illustrated herein, it is understood that all variations and modifications falling within the scope of the appended claims are intended to be embraced thereby.

What is claimed is:

1. An apparatus for calibrating the flow rate of a fluid being pumped to a receiving vessel which comprises in combination:

A. a receptacle which contains a calibrating medium that is denser than and immiscible to the fluid being calibrated, said receptacle having a high pressure leg with an inlet above the medium and a low pressure leg with an outlet above the medium and a receptacle conduit means for maintaining said legs in fluid communication, B. sensing means for sensing differential pressure, C. conduit means for flow of the fluid from a pump through said sensing means and said inlet to said high pressure leg, and for flow of the fluid from said low pressure leg through said outlet and said sensing means to the receiving vessel during the calibrating portion of the cycle, D. by-pass means for by-passing the fluid around said sensing means from the pump to the receiving vessel during the by-pass portion of the cycle, and E. timing mans operably connected to said by-pass means for controlling the time interval said apparatus remains in the calibrating portion of the cycle and for controlling the time interval said apparatus remains in the by-pass portion of the cycle.

2. The apparatus of claim 1 wherein second means is provided for receiving a signal of differential pressure from said sensing means and for translating the signal into amount of fluid pumped over the time interval of the calibrating portion of the cycle.

3. An apparatus for calibrating the flow rate of a fluid being pumped to a receiving vessel which comprises in combination:

A. a receptacle which contains a calibrating medium that is denser than and immiscible to the fluid being calibrated, said receptacle having a high pressure leg with an inlet above said medium and a low pressure leg with an outlet above said medium and a receptacle conduit means interconnecting the lower portions of said high pressure and low pressures legs for maintaining said legs in fluid communication, B. sensing means having a high pressure side and a low pressure side for sensing differential pressure and transmitting a signal representing the differential pressure, C. conduit means interconnecting the high pressure side of said sensing means and the inlet of said receptacle for flow of the fluid from a pump through the high pressure side of said sensing means to said high pressure leg and interconnecting the outlet of said receptacle and the low pressure side of said sensing means for flow of the fluid from said low pressure leg through the low pressure side of said sensing means to the receiving vessel during the calibrating portion of the cycle, D. by-pass means connected to said conduit means for by-passing the fluid around said sensing means from the pump to the receiving vessel during the by-pass portion of the cycle, E. calibrating timing means operably connected to said by-pass means for controlling the time interval said apparatus remains in the calibrating portion of the cycle, F. frequency timing means operably connected to said calibrating timing means for controlling the time interval said apparatus remains in the by-pass portion of the cycle, and G. second means operably connected to said sensing means for translating the signal into amount of fluid over the time interval of the calibrating portion of the cycle.

4. The apparatus of claim 3 wherein said calibrating timing means contains means for activating said frequency timing means after the calibrating portion of the cycle and said frequency timing means contains means for activating the calibrating timing means after the by-pass portion of the cycle.

5. The apparatus of claim 3 wherein said second means continuously records the amount of fluid per time interval.

6. The apparatus of claim 3 wherein a switch means is operably connected between said calibrating timing means and said frequency timing means and to said sensing means for ceasing the calibrating portion of the cycle and starting the by-pass portion of the cycle in the event the signal from said sensing means exceeds a given maximum.

7. An apparatus for calibrating the flow rate of a fluid being pumped to a receiving vessel which comprises in combination:

A. a receptacle which contains a calibrating medium that is denser than and immiscible to the fluid being calibrated, said receptacle having a high pressure leg with an inlet above said medium and a low pressure leg with an outlet above said medium and a receptacle conduit means interconnecting the lower portions of said high pressure and low pressures legs for maintaining said legs in fluid communication, B. sensing means having a high pressure side and a low pressure side for sensing differential pressure and transmitting a signal representing the differential pressure, C. high pressure conduit means interconnecting the high pressure side of said sensing means and the inlet of said receptacle for flow of the fluid from a pump through the high pressure side of said sensing means to said high pressure leg, D. low pressure conduit means interconnecting the outlet of said receptacle and the low pressure side of said sensing means for flow of the fluid from said low pressure leg through the low pressure side of said sensing means to the receiving vessel during the calibrating portion of the cycle, E. by-pass means interconnecting said high pressure and low pressure conduit means for by-passing the fluid around said sensing means from the pump to the receiving vessel during the by-pass portion of the cycle, F. calibrating timing means operably connected to said by-pass means for controlling the time interval said apparatus remains in the calibrating portion of the cycle G. frequency timing means operably connected to said calibrating timing means for controlling the time interval said apparatus remains in the by-pass portion of the cycle, and H. second means operably connected to said sensing means for translating the signal into amount of fluid over the time interval of the calibrating portion of the cycle.

8. The apparatus of claim 7 wherein said second means continuously records the amount of fluid per time interval.

9. The apparatus of claim 7 wherein the calibrating medium is mercury.

10. The apparatus of claim 7 wherein a switch means is electrically connected between said calibrating timing means and said frequency timing means and pneumatically connected to said sensing means for ceasing the calibrating portion of the cycle and starting the by-pass portion of the cycle in the event the signal from said sensing means exceeds a given maximum.

11. The apparatus of claim 7 wherein said frequency timing means is electrically connected to said calibrating timing means, wherein said calibrating timing means contains means for activating said frequency timing means after the calibrating portion of the cycle and said frequency timing means contains means for activating the calibrating timing means after the by-pass portion of the cycle.

12. The method for calibrating the flow of fluid through a pump to a receiving vessel which comprises the following steps:
A. setting a calibrating timing means for the time interval for a calibrating portion of a calibration cycle,
B. pumping the fluid for the time interval set by step (A) into a high pressure leg of a receptacle, a portion of which is filled with a calibrating medium which is denser than and immiscible to the fluid being pumped,
C. displacing an equal volume of the fluid from a low pressure leg of the receptacle to the reactor, the low pressure leg being in fluid communication with the high pressure leg,
D. sensing in a sensing means a differential pressure across the high and low pressure legs of the receptacle over the time interval set by step (A) and transmitting the signal represented by the differential pressure;
E. setting a frequency timing means for the time interval for a by-pass portion of the cycle,
F. pumping the fluid for the time interval set by step (E) through a by-pass means around the sensing means to the reactor, and
G. translating the signal from step (D) over the time interval of step (A) into amount of fluid flow per time interval.

* * * * *